US011240026B2

(12) United States Patent
White et al.

(10) Patent No.: US 11,240,026 B2
(45) Date of Patent: Feb. 1, 2022

(54) DEVICES AND METHODS OF MANAGING DATA

(71) Applicant: BlackBerry Limited, Waterloo (CA)

(72) Inventors: Johnathan George White, St. Albans (GB); Daniel Richard L. Brown, Mississauga (CA)

(73) Assignee: BlackBerry Limited, Waterloo (CA)

( * ) Notice: Subject to any disclaimer, the term of this patent is extended or adjusted under 35 U.S.C. 154(b) by 357 days.

(21) Appl. No.: 16/413,773

(22) Filed: May 16, 2019

(65) Prior Publication Data
US 2020/0366483 A1 Nov. 19, 2020

(51) Int. Cl.
*H04L 9/30* (2006.01)
*H04L 9/06* (2006.01)
*H04L 9/08* (2006.01)
*H04L 9/32* (2006.01)

(52) U.S. Cl.
CPC .......... *H04L 9/3066* (2013.01); *H04L 9/0631* (2013.01); *H04L 9/0844* (2013.01); *H04L 9/0861* (2013.01); *H04L 9/3242* (2013.01)

(58) Field of Classification Search
CPC ... H04L 9/3066; H04L 9/0631; H04L 9/0844; H04L 9/0861; H04L 9/3242
See application file for complete search history.

(56) References Cited

U.S. PATENT DOCUMENTS 10,015,150 B2 * 7/2018 Basin .................. H04L 9/083
10,523,646 B2 * 12/2019 Ackerly .............. H04L 63/0428
2004/0146015 A1 7/2004 Cross et al.
2007/0014416 A1 1/2007 Rivera et al.
2013/0046993 A1 * 2/2013 Jueneman ............... G06F 21/32
713/186
2014/0032933 A1 1/2014 Smith et al.
(Continued)

FOREIGN PATENT DOCUMENTS

GB 2533187 6/2016
GN 108449178 8/2018
GN 108599938 9/2018

OTHER PUBLICATIONS

Extended European Search Report dated Oct. 1, 2020, EP Application No. 20174233.5.

*Primary Examiner* — Joseph P Hirl
*Assistant Examiner* — Stephen T Gundry
(74) *Attorney, Agent, or Firm* — Rowand LLP

(57) ABSTRACT

Devices and methods of managing data stored within a container. The container may be associated with at least one registered user. The data within the container may be encrypted by a data encryption key (DEK). A computing device includes: a security module including a crypto-processor, a main processor, and memory. The memory stores instructions that, when executed, configure a processor to: authenticate a user based on a user secret associated with the container and generate a soft key based on the user secret. The instructions cause a crypto-processor to generate a secure generator output including a crypto key component and generate a hardened user key based on a key agreement protocol using the soft key and the crypto key component. The instructions cause a processor to construct an unencrypted DEK associated with the hardened user key and decrypt the subset of data using the unencrypted DEK.

20 Claims, 5 Drawing Sheets

(56) References Cited

U.S. PATENT DOCUMENTS

| | | | | |
|---|---|---|---|---|
| 2015/0106626 A1* | 4/2015 | Kremp | ............... | G06F 21/6209 |
| | | | | 713/189 |
| 2015/0121086 A1* | 4/2015 | Smith | ................... | G06F 21/556 |
| | | | | 713/189 |
| 2016/0283723 A1* | 9/2016 | Roth | ................... | H04L 63/1416 |
| 2017/0063544 A1* | 3/2017 | Oxford | ................... | H04L 9/083 |
| 2017/0063816 A1* | 3/2017 | Ackerly | ............. | H04L 63/0428 |
| 2017/0078255 A1* | 3/2017 | Nejadian | ................ | H04L 63/06 |
| 2017/0126642 A1* | 5/2017 | Basin | .................... | H04L 9/3247 |
| 2017/0310480 A1* | 10/2017 | Somani | ................ | H04L 9/3226 |
| 2018/0063095 A1* | 3/2018 | Poon | .................... | H04L 9/0833 |
| 2018/0167372 A1* | 6/2018 | Voicu | ................... | H04L 9/0825 |
| 2018/0191495 A1* | 7/2018 | Miller | ................. | G06F 21/602 |
| 2018/0287792 A1* | 10/2018 | Fu | ........................ | H04L 9/3231 |
| 2019/0228164 A1* | 7/2019 | Shen | ...................... | G06F 21/72 |
| 2019/0229924 A1* | 7/2019 | Chhabra | .............. | H04L 9/0637 |
| 2019/0288840 A1* | 9/2019 | Gallancy | ................ | H04L 9/085 |
| 2019/0356649 A1* | 11/2019 | Alwen | ................. | H04L 9/3218 |
| 2019/0356650 A1* | 11/2019 | Leavy | ................. | H04L 63/0815 |
| 2020/0195621 A1* | 6/2020 | Li | ........................ | H04L 9/3226 |
| 2020/0213111 A1* | 7/2020 | Leavy | ...................... | H04L 9/14 |

* cited by examiner

DEVICES AND METHODS OF MANAGING DATA

FIELD

The present application generally relates to data management and, in particular, to managing data stored within a container.

BACKGROUND

A computing device may be configured to secure data stored at the computing device. Stored data may be confidential or proprietary to a particular user and access to that stored data may be contingent on verifying an identity of a user who wishes to access the stored data. For example, a computing device may require a user to authenticate prior to operating the computing device and prior to accessing or modifying the stored data. Security operations may include comparing a received user input to a password list. In another example, security operations may include encrypting data using cryptographic keys associated with a particular user.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
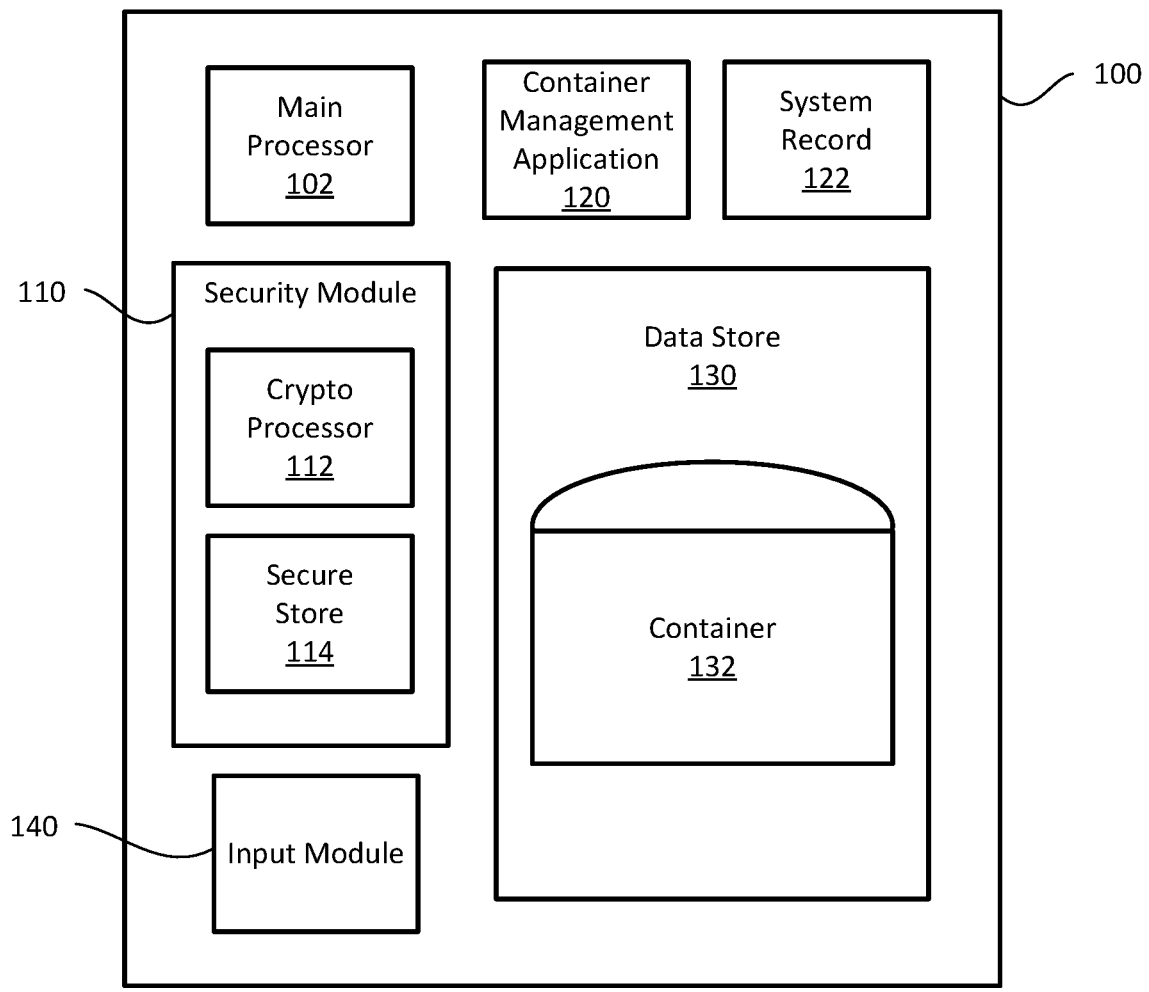
FIG. 1 illustrates, in simplified block diagram form, a computing device for managing data, in accordance with an example of the present application.

In a first aspect, the present application describes a method of managing data stored within a container on a computing device. The container may be associated with at least one registered user. The data within the container may be encrypted by a data encryption key (DEK) and stored as encrypted data. The method includes: authenticating a user based on a user secret associated with the container; generating a soft key based on the user secret; generating, by a crypto-processor other than a main processor of the computing device, secure generator output including a crypto key component associated with the authenticated user; generating, by the crypto-processor, a hardened user key based on a key agreement protocol using the soft key and the crypto key component associated with the authenticated user; constructing an unencrypted DEK associated with the hardened user key for accessing a subset of the data stored within the container; and decrypting the subset of data using the unencrypted DEK.

In another aspect, the present application describes a computing device managing data stored within a container. The container may be associated with at least one registered user. The data within the container may be encrypted by a data encryption key (DEK) and stored as encrypted data. The computing device includes: a security module including a crypto-processor; a main processor coupled to the security module; and a memory coupled to the processor and the crypto-processor. The memory may store instructions that, when executed, configure at least one of the main processor or the crypto-processor to: authenticate a user based on a user secret associated with the container; generate a soft key based on the user secret; generate, by the crypto-processor, secure generator output including a crypto key component associated with the authenticated user; generate, by the crypto-processor, a hardened user key based on a key agreement protocol using the soft key and the crypto key component associated with the authenticated user; construct an unencrypted DEK associated with the hardened user key for accessing a subset of the data stored within the container; and decrypt the subset of data using the unencrypted DEK.

In yet a further aspect, the present application describes non-transitory computer-readable storage medium storing processor-readable instructions that, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application relates to devices and methods of managing data stored within a container. A container may be a component of a sandboxing technique used to restrict access to specified data or applications stored on a computing device. That is, a container may be an allocated portion of addressable memory on the computing device for separating a specified set of data or applications from another set of data or applications stored in memory. To illustrate, a data container may compartmentalize enterprise data from personal data, or vice versa, stored in memory of an electronic device. The computing device may require that access to the enterprise be granted only in response to a successful authentication process, whereas access to the personal data may be granted without an authentication process. In another illustrative example, an application container may encapsulate files, dependencies or libraries of a software application running in an operating system.

To further secure data or applications stored within the container, the computing device may encrypt the data using a data encryption key (DEK). The security strength of the encrypted data may be associated with the security strength of methods used to manage the DEK. It may be desirable to minimize storing the DEK in raw or un-protected format. For example, an un-protected DEK may be an unencrypted DEK.

To increase data security, the computing device may encrypt the DEK using a user key that may be derived from a user secret and that is received from a user. That is, a user secret may be data input used for determining whether a user associated with the data input may be provided access to data or a data container. In some examples, the user secret may be an alpha-numeric password or a biometric input from the user. The user secret may be used for authenticating a user that is associated with the container and may be used for securing the DEK. In some examples, a user key may be generated based on the received user secret and a password-based derivation function (e.g., Password-Based Key Derivation Function 2 (PBKDF2) or the like.). The above-described example methods of generating a user key based on a received user secret and a password-based derivation function, however, may be vulnerable to an "offline attack". That is, an unscrupulous entity may attempt to extract or copy data from the computing device and onto another computing device (e.g., an offline device) for conducting brute force operations. Such brute force operations may be for uncovering the user key for decrypting the DEK. It may be desirable to provide devices and methods to thwart such attempts at conducting offline attacks.

Reference is made to FIG. 1, which illustrates, in simplified block diagram form, a computing device 100 for managing data, in accordance with an example of the present application. The computing device 100 includes a security module 110 and a main processor 102 coupled to the security module 110. In some examples, the computing device 100 may include a communications module for providing network communications capabilities with other computing devices. For example, the computing device 100 may receive, via the communications module, commands or data (e.g., user secret, etc.) as input for example operations described herein.

The security module 110 may be an integrated circuit configured to provide secure data including an identity and a known internal state of the computing device 100. In some examples, the security module 110 may include a crypto-processor 112 configured to execute operations relating to encryption, signing, key generation, random number generation, or the like. The security module 110 may include a secure store 114, such as non-volatile memory, for storing secret or proprietary data associated with the computing device 100. In some example operations described herein, the main processor 102 and/or the crypto-processor 112 may directly or indirectly retrieve data stored in the secure store 114. As an illustrative example, the security module 110 may be a trusted platform module (TPM) device or other similar device.

The computing device 100 may include memory storing applications or other data. For example, the computing device 100 may include memory that stores a container management application 120, a system record 122, and/or a data store 130. The container management application 120 may include processor readable instructions that, when executed, cause the main processor 102 and/or the crypto-processor 112 to perform operations to manage data stored within a container 132, among other example operations described herein. The system record 122 may be a data file including encryption keys, registered user info, or other data for managing stored data.

The computing device 100 includes the data store 130 for storing data, applications, filesystems, or the like. The data store 130 may include one or more containers 132, such as a security perimeter being associated with specified data, application, or filesystems. Although a single container is illustrated in FIG. 1, it may be contemplated that the data store 130 may include any number of containers. In some examples, the container 132 may be akin to a security perimeter and a component of a sandboxing technique to restrict access to specified data or applications. The container 132 may be associated with at least one registered user. Further, the one or more processors may allow access to the data or applications stored within the container to the at least one registered user once a registered user has been authenticated.

In some examples, the data or applications stored within the container 132 may be encrypted using a data encryption key (DEK) and stored as encrypted data. As an example, the data or applications stored within the container 132 may be encrypted with Advanced Encryption Standard Cipher Block Chaining (AES-CBC) mode using a 256-bit key (e.g., DEK). It may be appreciated that other examples of encryption protocols may be used. The DEK may be further encrypted with a user key, where the user key may be generated based on a user secret (e.g., a password, biometric input, etc.). An administrative server or an administrative user may specify the key length associated with the user key. In some examples, once the one or more processors may be configured to delete the container 132, the data or applications stored within the container 132 may correspondingly be deleted. In some examples, the one or more processors may register the container 132 by associating a generated user key with the container 132. The one or more processors may conduct operations to allow access to the data or applications within the container 132 in response to receiving an associated user key.

In some examples, the computing device 100 includes an input module 140. The input module 140 may include a touch screen display for displaying a user interface and a touch screen interface for receiving motion or touch input from the user of the computing device 100. The input module 140 may provide a user interface for a user to interact with the computing device 100. Other examples of input/output modules for displaying content to the user or for receiving input signals representing commands or selectable options from the user of the computing device 100 are contemplated.

Figure 2:
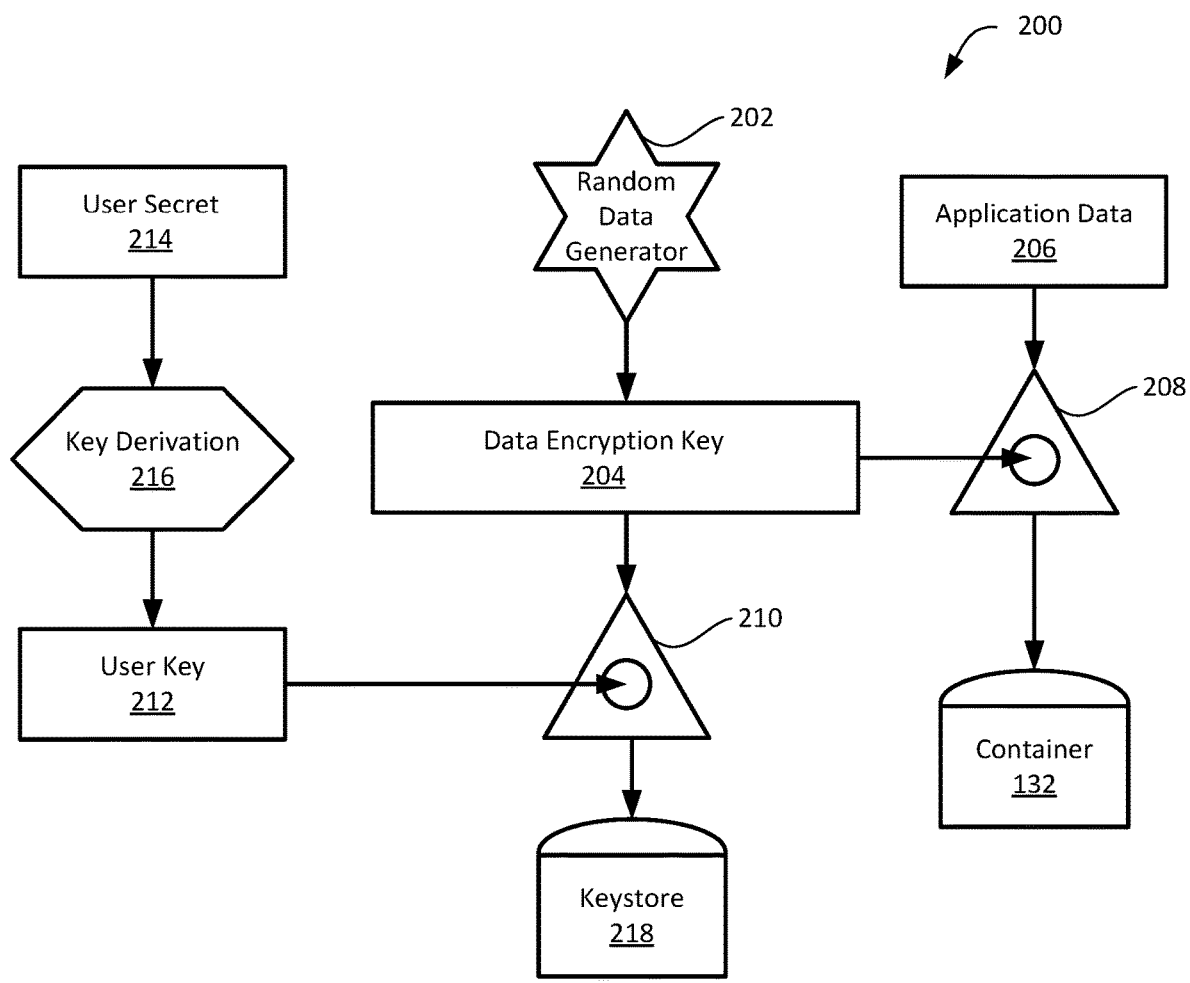
FIG. 2 illustrates encryption key derivation operations, in accordance with an example of the present application.

Reference is made to FIG. 2, which illustrates encryption key derivation operations 200, in accordance with one example of the present application. The main processor 102 may conduct a random number generator operation 202 to generate a data encryption key 204 (e.g., DEK). Further, the main processor 102 may conduct an encryption operation 208 to encrypt application data 206 using the data encryption key 204. The encryption operation 208 may include utilizing an AES-CBC protocol using a 256-bit key. In some examples, the data encryption key 204 may be 256-bit in length. The resulting encrypted application data may be stored within the container 132.

In some examples, the application data 206 may include two or more files or may include two or more portions of data. Further, there may be two or more cryptographic initialization vectors, and each initialization vector may be associated with a data file or a portion of data. Thus, the main processor 102 may conduct an encryption operation 208 on the respective files or portions of data using a respective initialization vector, thereby encrypting a given file or data portion separately than encrypting another file or data portion. Other encryption protocols for conducting the encryption operation 208 may be contemplated.

In some examples, the extent to which the encrypted application data may be secure corresponds to the extent that the data encryption key 204 is safeguarded. That is, it may be desirable to restrict usage of the data encryption key 204 to one or more registered users associated with the container 132. It may be desirable to minimize storing the DEK in plaintext or un-protected format. That is, it may be desirable to minimize storing an unencrypted DEK.

The main processor 102 may conduct a further encryption operation 210 to secure the data encryption key 204. The further encryption operation 210 may encrypt the data encryption key 204 using a user key 212. In some examples, the further encryption operation 210 may include utilizing an AES-CBC protocol using a 256-bit key. That is, the user key 212 may be 256-bit in length. Other encryption protocols for conducting the further encryption operation 210 may be contemplated.

The user key 212 may be based on a user secret 214 that is provided, via the input module 140 (FIG. 1), by a user of the computing device 100 (FIG. 1). For example, the user secret 214 may be an alpha-numeric input or a biometric input. Other formats of the user secret 214 may be contemplated. Once the user secret 214 is received, the main processor 102 may conduct key derivation operations 216 to derive the user key 212. In some examples, the key derivation operations 216 may include a Password-Based Key Derivation Function 2 (PBKDF2) operation. Other key derivation operations may be contemplated. Based on the user secret 214, the key derivation operation 216 may derive the user key 212 having a specified length. For example, the main processor 102 may derive a user key 212 having a 256-bit length, such that the main processor 102 may conduct the further encryption operations 210 to encrypt the previously generated data encryption key 204 using the user key 212.

In response to the encrypting the data encryption key 204 using the generated user key 212, the main processor 102 may store in a keystore 218 the data encryption key 204 in an encrypted format. In some examples, the keystore 218 may be a repository of stored security certificates, such as public key certificates, cryptographic keys, or the like. In some examples, the keystore 218 may be a data file, a cryptographic token, or other allocated portion of memory accessible by an operating system or applications. In some examples, the system records 122 of FIG. 1 may include the keystore 218. That is, the keystore 218 may not be stored within a secure enclave, but may be stored in memory that is accessible by the main processor 102. In some further examples, the keystore 218 (or contents of the keystore 218) may be encrypted or otherwise obfuscated based on a static key, where the static key that may be stored at the computing device 100.

In some examples, the main processor 102 may generate a data encryption key 204 or a user key 212 having any length. For instance, the data encryption key 204 or the user key 212 may be 256-bits in length or greater. A longer key length may increase the robustness of any generated encryption keys. Nonetheless, in some examples, the encryption key derivation operations 200 illustrated in FIG. 2 may be vulnerable to an "offline attack". That is, an unscrupulous entity may attempt to extract or copy data from the computing device 100 and onto another computing device (e.g., an offline device) for conducting brute force operations for determining the user key 212. In some examples, the offline computing device may include a supercomputer, such as a computer with comparatively high floating-point operations per second, as compared to a general-purpose computer. Other types of computers operating as offline devices with hardware/software configured to conduct operations to "crack"/reverse-engineer passwords or with high floating-point operations per second may be contemplated. Once the user key 212 is derived, the unscrupulous entity may decrypt an encrypted form of the data encryption key 204. To further increase the robustness of operations to protect the data encryption key 204, devices and methods including operations from a security module 110 (FIG. 1) are be provided.

Figure 3:
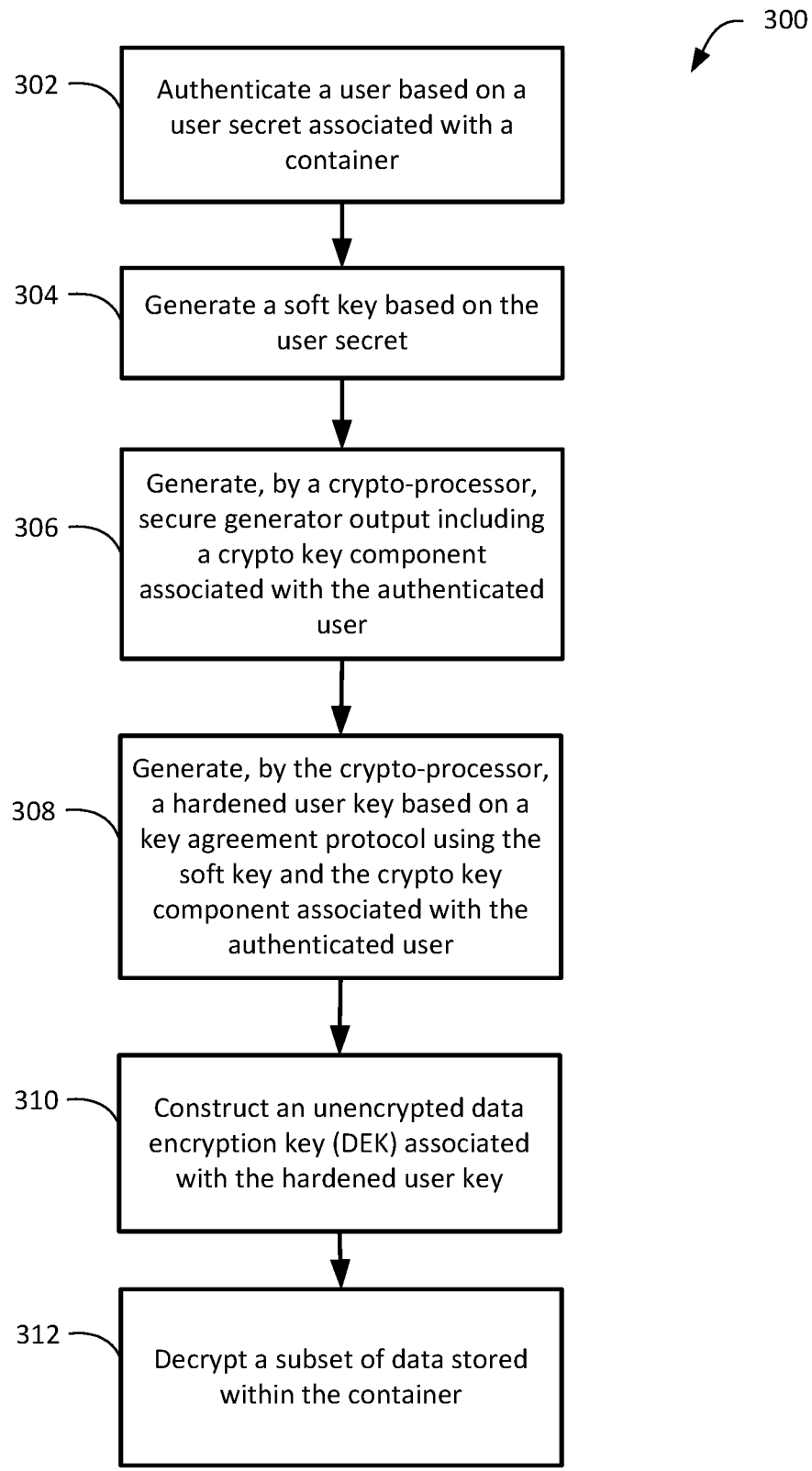
FIG. 3 illustrates, in flowchart form, a method of managing data stored within a container, in accordance with an example of the present application.

Reference is made to FIG. 3, which illustrates, in flowchart form, a method 300 of managing data stored within a container 132 (FIG. 1) on a computing device 100 (FIG. 1), in accordance with an example of the present application. The method 300 includes operations that may be carried out by one or more processors of the computing device 100. For example, the method 300 may include operations that may be carried out by at least one of the main processor 102 or the crypto-processor 112. The method 300 may be implemented, at least in part, through processor executable instructions associated with the container management application 120 (FIG. 1). In some examples, one or more operations may be implemented via processor executable instructions in other applications or in an operating system stored and executed on the computing device 100.

In some examples, the container 132 (FIG. 1) may be associated with at least one registered user. That is, one or more processors may register the container 132 by associating one or more users to the container 132, where each respective user may be associated with a user secret (e.g., a password). The user secret may be used for authenticating the user at the computing device 100 and for providing access to data and/or applications stored within the container 132. The data stored within the container 132 may be encrypted by a data encryption key (DEK) and stored as encrypted data.

At operation 302, the one or more processors may authenticate a user based on a user secret associated with the container 132. The user secret may be an alpha-numeric input or a biometric input. That is, the computing device 100 may authenticate the user such that the user may be permitted to operate the input module 140 (FIG. 1) of the computing device and may be permitted to access or modify data stored within the container 132. Other types of input for receiving the user secret may be contemplated.

At operation 304, the one or more processors may generate a soft key based on the user secret. A soft key may be a key derived based on a software derivation function and the user secret. In some examples, the software derivation function may include operations conducted by a main or general purpose processor of the computing device. The one or more processors may generate the soft key using a key derivation function, such as Password-Based Key Derivation Function 2 (PBKDF2). For instance, the key derivation function may utilize apply a pseudorandom function to the user secret and a salt value to generate a user key The user key may be used as a cryptographic key for subsequent operations. The salt value may be random data used as additional input to the pseudorandom function. Other key derivation functions for generating the soft key may be contemplated. For example, the key derivation function may be a hash-based message authentication code (HMAC). In some examples, the key derivation function may provide a soft key having a specific length. For example, the one or more processors may be configured to generate a soft key having a 256-bit length.

At operation 306, the crypto-processor 112 (FIG. 1) may generate secure generator output including a crypto key component associated with the authenticated user. The secure generator output may be based on a secure random number generator output, such as a pseudo-random number generator with characteristics that may be understood to be suitable for cryptography operations. The crypto-processor 112 may be a processor that is other than the main processor 102 (FIG. 1). In some examples, the crypto-processor 112 may be a distinct processor separate from the main processor 102 for conducting operations relating to encryption, key or data signing, key generation, random number generation, or the like. The crypto-processor 112 may be a component of the security module 110, such that select data or keys generated by the crypto-processor 112 may be confined to the security module 110 and may not be permitted to be copied or released in plaintext or unencrypted format outside the security module 110.

In some examples, the secure generator output includes a first elliptic curve cryptography (ECC) key pair and a second ECC key pair. Each of the respective ECC key pairs include a private key and a public key. In the present example, the crypto-processor 112 may discard a public key of the first ECC key pair and a private key of the second ECC key pair, such that the crypto key component includes the private key of the first ECC key pair and the public key of the second ECC key pair.

At operation 308, the crypto-processor 112 may generate a hardened user key based on a key agreement protocol using the soft key and the crypto key component associated with the authenticated user. The hardened user key may be a key derived based on one or more cryptographic keys generated by a secure hardware component of the computing device. In some examples, at least a portion of the cryptographic keys generated by the secure hardware component may be confined to the secure hardware component or accessible only when access to the secure hardware component is provided. In some examples, the key agreement protocol may be based on elliptic curve cryptography, such as an Elliptic-Curve Diffie-Hellman (ECDH) protocol or operations. In the present example, the hardened user key may be generated based on the previously generated soft key and the crypto key component. As the hardened user key is based on the crypto key component, it may be challenging for an unscrupulous entity to extract or copy the memory contents of the computing device 100 to another computing device (e.g., an offline device) and, subsequently, to conduct brute force operations for determining a user key for decrypting a data encryption key associated with the container 132. That is, as the private key of the first ECC key pair may be contained within the security module 110 and inaccessible by an external computing device or process, the unscrupulous entity may be unable to generate the hardened user key. Without being able to generate the hardened user key, the unscrupulous entity may be unable to decrypt the hardened DEK for decrypting associated data stored within the container 132.

In some examples, in a previous process, the one or more processors may have encrypted data stored within the container 132 using an Advanced Encryption Standard (AES) protocol and the hardened user key. When the user requests access to the data stored within the container 132, the one or more processors, at operation 310, may construct an unencrypted DEK associated with the hardened user key for accessing a subset of the data stored within the container 132.

At operation 312, the one or more processors may decrypt the subset of data using the unencrypted DEK. Thus, when the one or more processors receive a user secret from a registered user, example operations of the main processor 102 and the crypto-processor 112 described herein may collectively generate a hardened user key that may be used to decrypt a previously encrypted DEK. The unencrypted DEK may be used for decrypting data that may be associated with the authenticated user and that is stored in the container 132.

In some examples, the one or more processors may further secure additional data associated with the authenticated user using the unencrypted DEK. That is, the one or more processors may conduct operations for receiving, via a communication module, additional data from another computing device or via the input module 140. Further, the one or more processors may encrypt the additional data using the unencrypted DEK (from operation 310) and, subsequently, store the encrypted additional data within the container 132.

In some examples, constructing the unencrypted DEK includes decrypting the hardened DEK using an Advanced Encryption Standard (AES) protocol and the hardened user key. For instance, the AES protocol may be the AES-CBC protocol operations.

A subset of the operations of the method 300 may conducted by the main processor 102 and another subset of the operations of method 300 may be conducted by the crypto-processor 112. For example, operations 302, 304, 310, and 312 may be conducted by the main processor 102 and operations 306 and 308 may be conducted by the crypto-processor 112. That is, the crypto-processor 112 may conduct operations associated with generating a crypto key component and with generating a hardened user key using a key component that is intended to be undecipherable outside the security module 110. Thus, the example operations of the method 300 may generate a hardened user key based on key components that depend on secure hardware aspects of the computing device 100 in addition to a soft key or user secret received from a registered and authenticated user associated with the container 132.

Figure 4:
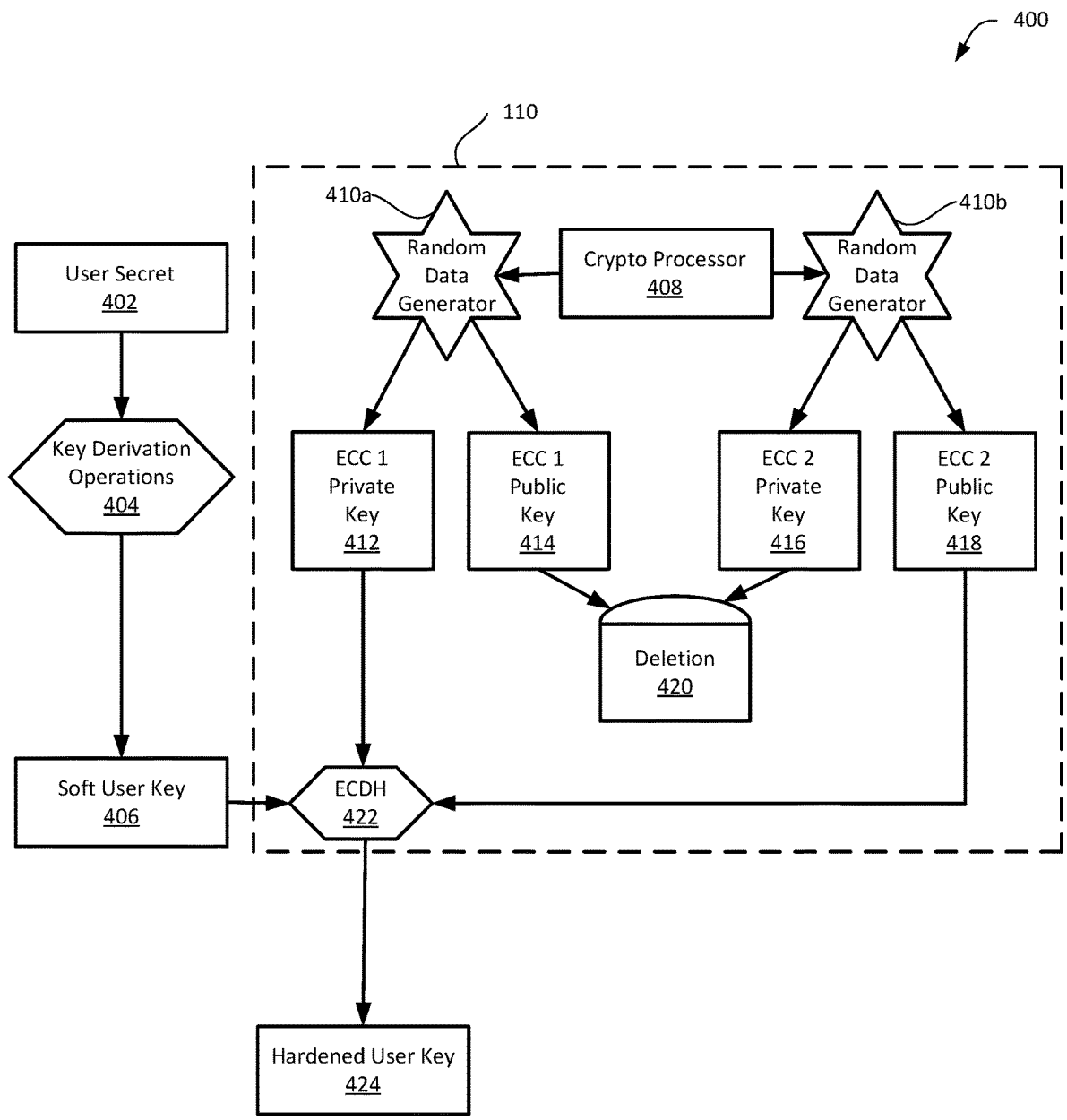
FIG. 4 illustrates hardened user key generation operations, in accordance with an example of the present application.

To illustrate the method 300 of FIG. 3 with a specific example, reference is made to FIG. 4, which illustrates, hardened user key generation operations 400, in accordance with an example of the present application. In FIG. 4, a subset of the operations may be associated with the security module 110 (FIG. 1), which are illustrated within the hashed-line box. The subset of operations that may be associated with the security module 110 may be conducted by the crypto-processor 112. In the present example, another subset of operations, which are illustrated outside the hashed box, may be conducted by the main processor 102.

As described in some examples herein, a DEK may be used for encrypting data, applications, filesystems, or the like, where the encrypted data, applications, or filesystems may be stored in a container 132 (FIG. 1) of a computing device 100 (FIG. 1). A registered container may be associated with a user who may wish to secure and store data within the container 132. The data may be encrypted using a DEK and, subsequently, the encrypted data may be stored in the container 132. It may be appreciated that the DEK may be encrypted using a hardened user key. Accordingly, the data that has been encrypted using the DEK may be associated with a user corresponding to the hardened user key. As will be described with reference to FIG. 4, the hardened user key may be generated based on operations that may be conducted within the security module 110 (FIG. 1) and based on operations that may be conducted exterior to the security module 110.

The main processor 102 (FIG. 1) may receive, via the input module 140 (FIG. 1), a user secret 402. In some examples, the user secret may be a password in alphanumeric format or may be a biometric input.

The main processor 102 may conduct key derivation operations 404, such as operations of the PBKDF2 protocol, based on the user secret 402 to generate a soft user key 406. In the present example, the PBKDF2 protocol may utilize: (i) a user salt value based on randomly generated 64 bits of data and the user secret 402 to provide a 256-bit soft user key. It may be appreciated that the user salt value may be based on other quantities of randomly generated data and the soft user key 406 may be any other length.

A crypto-processor 408 may generate, by secure random number generator (RNG) operations, two sets of random generated data (identified individually as 410a and 410b) for providing encryption keys. In the present example, a first set of random generated data 410a may provide a first ECC key pair including a private key 412 of the first ECC key pair and a public key 414 of the first ECC key pair. Similarly, a second set of random generated data 410b may provide a second ECC key pair including a private key 416 of the second ECC key pair and a public key 418 of the second ECC key pair.

In the present example, the crypto-processor 408 may delete 420 or disregard the public key 414 of the first ECC key pair and may delete or disregard the private key 416 of the second ECC key pair. The remaining private key 412 of the first ECC key pair and the public key 418 of the second ECC key pair may be used as inputs to a subsequent key agreement protocol operations for generating a hardened user key 424. In some examples, the hardened DEK may be stored in an un-migratable portion of the computing device. In the present example, the ECC keys that are not deleted or disregarded may be accessible by the crypto-processor 408 in response to a successful authentication of the user. For example, the ECC keys may be accessible in response to a successful authentication of the user based on the received user secret.

In some examples, the public key 418 of the second ECC key pair may be stored at a keystore external to the security module 110, whereas the private key 412 of the first ECC key pair may be stored within the security module 110. For instance, the private key 412 of the first ECC key pair may be stored in a secure store 114 (FIG. 1) of the security module 110. It may be appreciated that these aforementioned keys may be associated with the user of the user secret 402. When the computing device 100 requires a hardened key associated with an authorized user corresponding to the user secret 402, the crypto-processor 408 may generate the hardened user key 424 based on the soft user key 406 as an input to a further encryption operation 422.

The main processor 102 may conduct the further encryption operation 422 based on a combination of the generated soft user key 406, the private key 412 of the first ECC key pair, and the public key 418 of the second ECC key pair. For instance, the further encryption operation 422 may utilize the soft user key 406 as input of Elliptic-curve Diffie-Hellman (ECDH) protocol operations with: (a) the private key 412 of the first ECC key pair and (b) the public key 418 of the second ECC key pair to generate a hardened user key 424. For example, the soft user key 406 may be provided to the Elliptic-curve Diffie-Hellman (ECDH) protocol operations as an ECC-CMS-SharedInfo entityUInfo parameter. That is, the ECC-CMS-SharedInfo entityUInfo field may represent a derived form of the data provided by the user (see e.g., https://tools.ietf.org/html/rfc8418).

In some examples, the hardened user key 424 may be used to encrypt a DEK previously used to encrypt data stored in a container 132 (FIG. 1) and that is associated with the user corresponding to the user secret 402. It may be appreciated that the hardened user key 424 may be based on (i) a user secret 402, which may be used to authenticate a user; and (ii) encryption keys that may, at least, in part be inaccessible by processes external to the security module 110. Accordingly, an "offline attack" by an unscrupulous entity may be thwarted, even if the unscrupulous entity was successful copying data (including data within a container) to an offline computing device. Based on the devices and methods described herein, the unscrupulous entity may be unable to generate a hardened user key 424 necessary for: (a) decrypting a DEK associated with data stored in the container 132; and (b) subsequently decrypting the data stored in the container. Without an unencrypted DEK, the unscrupulous entity may be unable to decrypt data stored in the container.

In another implementation, one of a main processor or a crypto-processor may receive a user secret. Based on the user secret, one of the main processor or the crypto-processor may generate an ECC public key based on the user secret. For example, the main processor or the crypto-processor may map the user secret or a representation of the user secret as a point on an Elliptic curve associated with encryption operations of the computing device. Thus, the ECC public key may be identified at the particular point on the Elliptic curve. Accordingly, the crypto-processor may conduct ECDH operations with the generated ECC public key for generating a hardened user key for decrypting a DEK.

Figure 5:
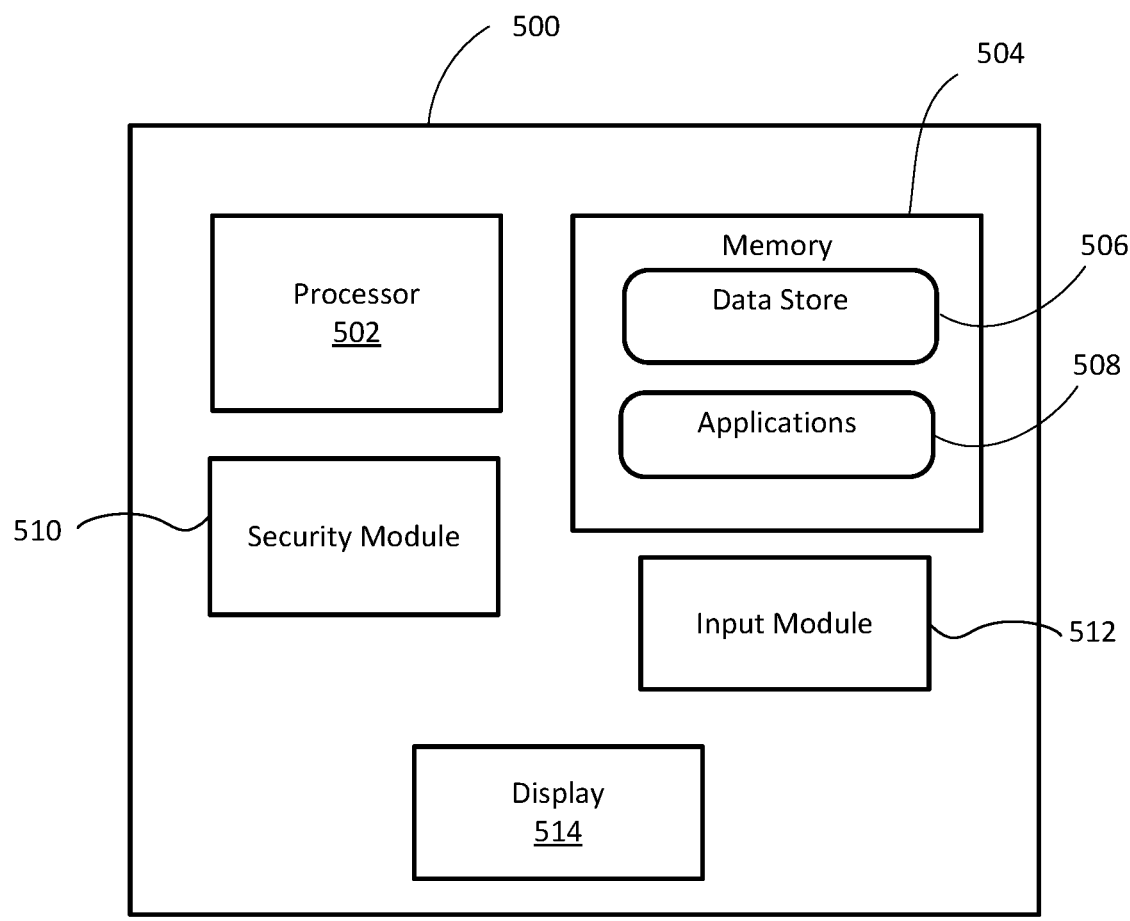
FIG. 5 illustrates, in simplified block diagram form, an electronic device, in accordance with an example of the present application.

Reference is made to FIG. 5, which illustrates, in simplified block diagram form, an electronic device 500, in accordance with an example of the present application. The electronic device 500 may be the example computing device 100 illustrated in FIG. 1.

The electronic device 500 includes one or more main processors 502, memory 504, and a communications module. The communication module may provide the computing device 100 with network capabilities to communicate with other computing devices. The memory 504 may include a data store 506 for storing data, applications, filesystems, or the like. Further, the data store 506 may include one or more of the example containers 132 of FIG. 1. The memory 504 may store processor executable software applications 508 that may include an operating system to provide basic device operations. The software applications 508 may also include instructions implementing operations of the methods described herein.

The electronic device 500 may include a security module 510, which may be a hardware-based circuit to provide trusted information, including the identity and internal state data of the electronic device 500. The security module 510 may provide cryptographic functionality including encrypting, signing, key generation, random number generation, or the like. In one example, the security module 510 may correspond to the security module 110 of FIG. 1.

The electronic device 500 may include an input module 512 for receiving signals representing user input. For example, the input module 512 may be a keyboard device, a touch input device, an acoustic input device, or any other device for receiving signals representing user input as described in examples herein. The electronic device 500 may include a display interface and/or a display 514. The display 514 may include examples such as a liquid crystal display (LCD), an e-ink/e-paper display, or the like. In some examples, the display 514 may be a touchscreen display.

In some examples, the electronic device 500 may be a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments may be made. Therefore, the above discussed embodiments are considered to be illustrative and not restrictive.

What is claimed is:

1. A method of managing data stored within a container on a computing device, the container being associated with at least one registered user, the data within the container being encrypted by a data encryption key (DEK) and stored as encrypted data, the method comprising:
   authenticating a user based on a user secret associated with the container;
   generating a soft key based on the user secret;
   generating, by a crypto-processor other than a main processor of the computing device, secure generator output including a crypto key component associated with the authenticated user;
   generating, by the crypto-processor, a hardened user key based on a key agreement protocol using the soft key and the crypto key component associated with the authenticated user;
   constructing an unencrypted DEK associated with the hardened user key for accessing a subset of the data stored within the container; and
   decrypting the subset of the data using the unencrypted DEK.

2. The method of claim 1, wherein the secure generator output includes a first elliptic curve cryptography (ECC) key pair and a second ECC key pair.

3. The method of claim 2, further comprising:
   discarding, by the crypto-processor, a public key of the first ECC key pair and a private key of the second ECC key pair, and wherein the crypto key component includes the private key of the first ECC key pair and the public key of the second ECC key pair.

4. The method of claim 1, wherein the key agreement protocol is based on elliptic curve cryptography.

5. The method of claim 1, wherein the key agreement protocol includes Elliptic-Curve Diffie-Hellman (ECDH).

6. The method of claim 1, wherein the soft key includes a specified length and is generated using Password-Based Key Derivation Function 2 (PBKDF2).

7. The method of claim 6, wherein the PBKDF2 operations include Hash-based Message Authentication Code (HMAC) operations.

8. The method of claim 1, wherein constructing the unencrypted DEK includes decrypting a hardened DEK using an Advanced Encryption Standard (AES) protocol and the hardened user key, wherein the hardened DEK is stored in an un-migratable portion of the computing device.

9. The method of claim 1, further comprising securing additional data associated with the authenticated user using the unencrypted DEK.

10. The method of claim 1, wherein the secure generator output is based on a secure random number generator output.

11. A computing device managing data stored within a container, the container being associated with at least one registered user, the data within the container being encrypted by a data encryption key (DEK) and stored as encrypted data, the computing device comprising:
    a security module including a crypto-processor;
    a main processor coupled to the security module; and
    a memory coupled to the processor and the crypto-processor, the memory storing instructions that, when executed, configure at least one of the main processor or the crypto-processor to:
    authenticate a user based on a user secret associated with the container;
    generate a soft key based on the user secret;
    generate, by the crypto-processor, secure generator output including a crypto key component associated with the authenticated user;
    generate, by the crypto-processor, a hardened user key based on a key agreement protocol using the soft key and the crypto key component associated with the authenticated user;
    construct an unencrypted DEK associated with the hardened user key for accessing a subset of the data stored within the container; and
    decrypt the subset of the data using the unencrypted DEK.

12. The computing device of claim 11, wherein the secure generator output includes a first elliptic curve cryptography (ECC) key pair and a second ECC key pair.

13. The computing device of claim 12, wherein the instructions, when executed, further configure the crypto-processor to discard a public key of the first ECC key pair and a private key of the second ECC key pair, and wherein the crypto key component includes the private key of the first ECC key pair and the public key of the second ECC key pair.

14. The computing device of claim 11, wherein the key agreement protocol is based on elliptic curve cryptography.

15. The computing device of claim 11, wherein the key agreement protocol includes Elliptic-Curve Diffie-Hellman (ECDH).

16. The computing device of claim 11, wherein the soft key includes a specific length and is generated using Password-Based Key Derivation Function 2 (PBKDF2).

17. The computing device of claim 11, wherein constructing the unencrypted DEK includes decrypting a hardened DEK using an Advanced Encryption Standard (AES) protocol and the hardened user key, wherein the hardened DEK is stored in an un-migratable portion of the computing device.

18. The computing device of claim 11, wherein the instructions, when executed, further configure the main processor to secure additional data associated with the authenticated user using the unencrypted DEK.

19. The computing device of claim 11, wherein the secure generator output is based on a secure random number generator output.

20. A non-transitory computer-readable storage medium storing instructions for managing data stored within a container, the container being associated with at least one registered user, the data within the container being encrypted by a data encryption key (DEK) and stored as encrypted data, the instructions, when executed by at least one of a main processor or a crypto-processor of a computing device, cause the computing device to:
  authenticate a user based on a user secret associated with the container;
  generate a soft key based on the user secret;
  generate, by the crypto-processor, secure generator output including a crypto key component associated with the authenticated user;
  generate, by the crypto-processor, a hardened user key based on a key agreement protocol using the soft key and the crypto key component associated with the authenticated user;
  construct an unencrypted DEK associated with the hardened user key for accessing a subset of the data stored within the container; and
  decrypt the subset of the data using the unencrypted DEK.

* * * * *